US012778105B2

(12) United States Patent
Smith et al.

(10) Patent No.: US 12,778,105 B2
(45) Date of Patent: Nov. 3, 2026

(54) SYSTEM AND METHOD FOR AN AGRICULTURAL APPLICATOR

(71) Applicant: CNH Industrial America LLC, New Holland, PA (US)

(72) Inventors: Benjamin Smith, Brillion, WI (US); Roy A. Bittner, Reedsville, WI (US)

(73) Assignee: CNH Industrial America LLC, New Holland, PA (US)

( * ) Notice: Subject to any disclaimer, the term of this patent is extended or adjusted under 35 U.S.C. 154(b) by 45 days.

(21) Appl. No.: 18/630,062

(22) Filed: Apr. 9, 2024

(65) Prior Publication Data

US 2025/0311711 A1 Oct. 9, 2025

(51) Int. Cl.
*A01M 7/00* (2006.01)

(52) U.S. Cl.
CPC ........ *A01M 7/0057* (2013.01); *A01M 7/0078* (2013.01)

(58) Field of Classification Search
CPC .............. A01M 7/0053; A01M 7/0057; A01M 7/0071; A01M 7/0075; A01M 7/0078; F15B 11/0406; F15B 11/042; F15B 11/044; F15B 11/05
See application file for complete search history.

(56) References Cited

U.S. PATENT DOCUMENTS

| | | | | |
|---|---|---|---|---|
| 4,288,034 A | 9/1981 | Widmer et al. | | |
| 5,755,382 A | 5/1998 | Skotinkov | | |
| 6,027,039 A | 2/2000 | Mercil | | |
| 6,119,963 A * | 9/2000 | Bastin | A01M 7/0075 239/168 | |
| 6,293,475 B1 | 9/2001 | Sobolik | | |
| 7,823,803 B2 | 11/2010 | Peterson et al. | | |
| 11,350,621 B2 * | 6/2022 | Bauer | A01M 7/0057 | |
| 2009/0173802 A1 * | 7/2009 | Theeuwen | A01M 7/0053 239/164 | |
| 2016/0316737 A1 | 11/2016 | Pilney | | |
| 2023/0022730 A1 * | 1/2023 | Maia | A01C 23/008 | |

OTHER PUBLICATIONS

Co Pending U.S. Appl. No. 18/428,117, filed Jan. 31, 2024.

* cited by examiner

*Primary Examiner* — Gerald L Sung
*Assistant Examiner* — Jingchen Liu
(74) *Attorney, Agent, or Firm* — Dority & Manning, P.A.

(57) ABSTRACT

An agricultural boom assembly may include an inner boom section and a breakaway boom section. A hinge assembly may be configured to guide movement of the breakaway boom section relative to the inner boom section. A damper system may be operably coupled with the inner boom section and the breakaway boom section. The damper system may include a cylinder configured to house a piston and a rod coupled to the piston and extending from the cylinder. The cylinder may define a piston-side chamber and a rod-side chamber within the cylinder. A pressure reducing-relieving valve may be fluidly coupled with the piston-side chamber and the rod-side chamber. A flow control valve may be positioned between the pressure reducing-relieving valve and the rod-side chamber. A relief valve may be positioned in parallel with the flow control valve.

18 Claims, 7 Drawing Sheets

SYSTEM AND METHOD FOR AN AGRICULTURAL APPLICATOR

FIELD

The present disclosure generally relates to agricultural machines and, more particularly, to systems and methods for a boom assembly of the agricultural machine.

BACKGROUND

Various types of machines utilize applicators (e.g., sprayers, floaters, etc.) to deliver an agricultural product to aground surface of afield. The agricultural product may be in the form of a solution or mixture, with a carrier (such as water) being mixed with one or more active ingredients (such as an herbicide, agricultural product, fungicide, a pesticide, or another product).

The applicators may be pulled as an implement or self-propelled and may include a tank, a pump, a boom assembly, and a plurality of nozzles carried by the boom assembly at spaced locations. The boom assembly may include a pair of boom arms, with each boom arm extending to either side of the applicator when in an unfolded state. Each boom arm may include multiple boom sections, each with a number of spray nozzles (also sometimes referred to as spray tips).

During the operation of the agricultural machine, however, in some instances, an outer portion of the boom assembly may contact an abject. Accordingly, an improved system and method for a breakaway boom section would be welcomed in the technology.

BRIEF DESCRIPTION

Aspects and advantages of the technology will be set forth in part in the following description, or may be obvious from the description, or may be learned through practice of the technology.

In some aspects, the present subject matter is directed to an agricultural boom assembly that includes an inner boom section, a breakaway boom section, and a hinge assembly configured to guide movement of the breakaway boom section relative to the inner boom section. A damper system is operably coupled with the inner boom section and the breakaway boom section. The damper system includes a cylinder configured to house a piston and a rod coupled to the piston and extending from the cylinder. The cylinder defines a piston-side chamber and a rod-side chamber within the cylinder. A pressure reducing-relieving valve is fluidly coupled with the piston-side chamber and the rod-side chamber. A flow control valve is positioned between the pressure reducing-relieving valve and the rod-side chamber. A relief valve is positioned in parallel with the flow control valve.

In some aspects, the present subject matter is directed to a method for an agricultural application operation. The method includes providing a hydraulic fluid, via a pressure reducing-relieving valve, to a piston-side chamber and a rod-side chamber of a cylinder to cause a net extending force of a breakaway boom section. The method further includes deflecting the breakaway boom section of a boom assembly. The method also includes pulling, via a flow control valve, hydraulic fluid into the rod-side chamber of the cylinder. Lastly, the method includes metering, via the flow control valve, the hydraulic fluid expelling from the rod-side chamber of the cylinder.

In some aspects, the present subject matter is directed to a damper system for a boom assembly. The damper system includes a cylinder configured to house a piston. A rod is coupled to the piston and extends from the cylinder. The cylinder defines a piston-side chamber and a rod-side chamber within the cylinder. A pressure reducing-relieving valve is fluidly coupled with the piston-side chamber and the rod-side chamber. A flow control valve is positioned between the pressure reducing-relieving valve and the rod-side chamber. A relief valve is positioned in parallel with the flow control valve.

These and other features, aspects, and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
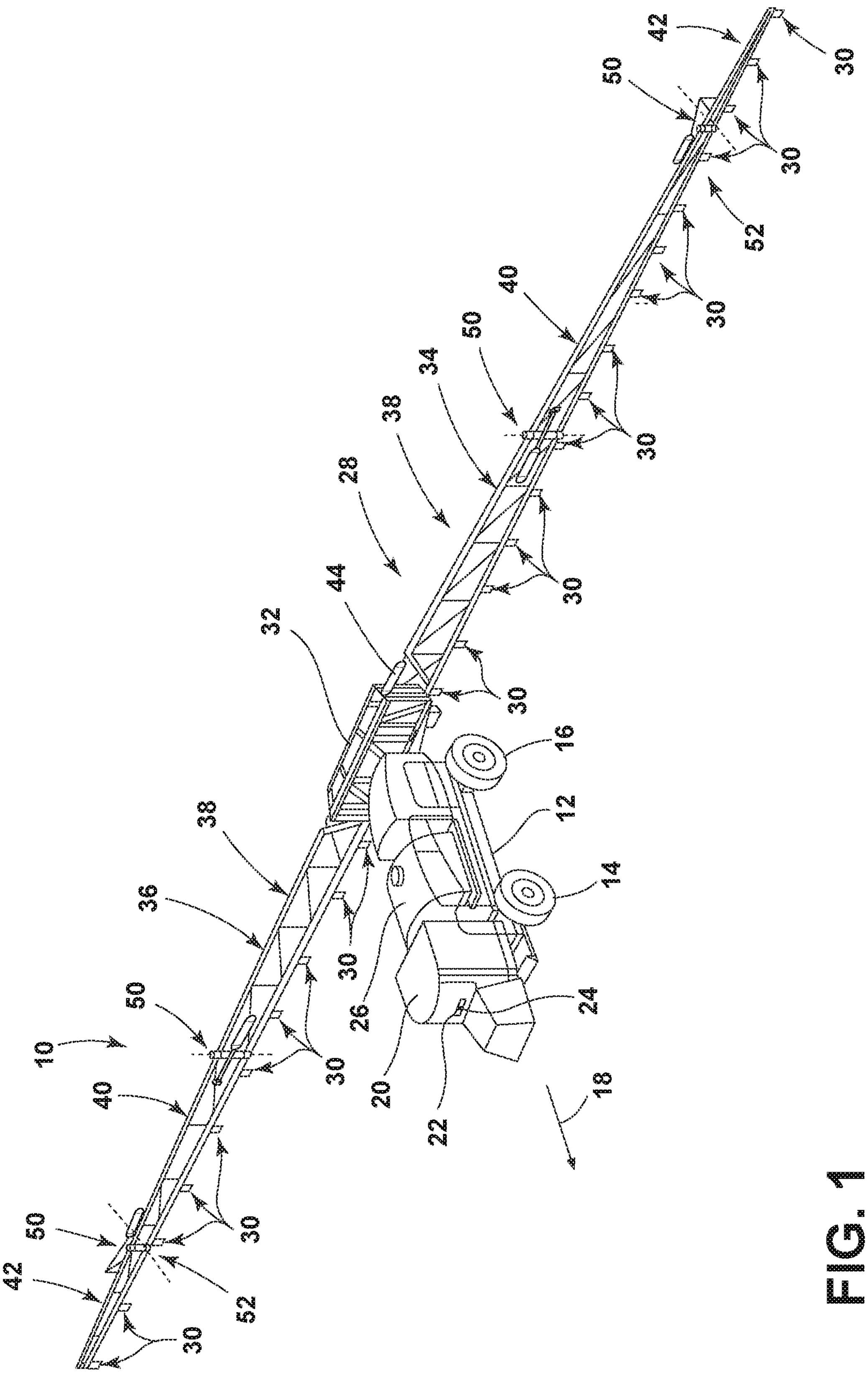
FIG. 1 illustrates a perspective view of an agricultural machine in accordance with aspects of the present subject matter.

Repeat use of reference characters in the present specification and drawings is intended to represent the same or analogous features or elements of the present technology.

DETAILED DESCRIPTION

Reference now will be made in detail to embodiments of the disclosure, one or more examples of which are illustrated in the drawings. Each example is provided by way of explanation of the discourse, not limitation of the disclosure. In fact, it will be apparent to those skilled in the art that various modifications and variations may be made in the present disclosure without departing from the scope or spirit of the disclosure. For instance, features illustrated or described as part may be used with another embodiment to yield a still further embodiment. Thus, it is intended that the present disclosure covers such modifications and variations as come within the scope of the appended claims and their equivalents.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the terms "first," "second," and "third" may be used interchangeably to distinguish one component from another and are not intended to signify a location or importance of the individual components. The terms "coupled," "fixed," "attached to," and the like refer to both direct coupling, fixing, or attaching, as well as indirect coupling, fixing, or attaching through one or more intermediate components or features, unless otherwise specified herein. The terms "upstream" and "downstream" refer to the relative direction with respect to an agricultural product within a fluid circuit. For example, "upstream" refers to the direction from which an agricultural product flows, and "downstream" refers to the direction to which the agricultural product moves. The term "selectively" refers to a component's ability to operate in various states (e.g., an ON state and an OFF state) based on manual and/or automatic control of the component.

Furthermore, any arrangement of components to achieve the same functionality is effectively "associated" such that the functionality is achieved. Hence, any two components herein combined to achieve a particular functionality may be seen as "associated with" each other such that the desired functionality is achieved, irrespective of architectures or intermedial components. Likewise, any two components so associated may also be viewed as being "operably connected" or "operably coupled" to each other to achieve the desired functionality, and any two components capable of being so associated may also be viewed as being "operably couplable" to each other to achieve the desired functionality. Some examples of operably couplable include, but are not limited to, physically mateable, physically interacting components, wirelessly interactable, wirelessly interacting components, logically interacting, and/or logically interactable components.

The singular forms "a," "an," and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about," "approximately," "generally," and "substantially," is not to be limited to the precise value specified. In at least some instances, the approximating language may correspond to the precision of an instrument for measuring the value, or the precision of the methods or apparatus for constructing or manufacturing the components and/or systems. For example, the approximating language may refer to being within a ten percent margin.

Moreover, the technology of the present application will be described in relation to exemplary embodiments. The word "exemplary" is used herein to mean "serving as an example, instance, or illustration." Any embodiment described herein as "exemplary" is not necessarily to be construed as preferred or advantageous over other embodiments. Additionally, unless specifically identified otherwise, all embodiments described herein should be considered exemplary.

As used herein, the term "and/or," when used in a list of two or more items, means that any one of the listed items may be employed by itself, or any combination of two or more of the listed items may be employed. For example, if a composition or assembly is described as containing components A, B, and/or C, the composition or assembly may contain A alone; B alone; C alone; A and B in combination; A and C in combination; B and C in combination; or A, B, and C in combination.

In general, the present subject matter is directed to an agricultural boom assembly that may include an inner boom section and a breakaway boom section. A hinge assembly may be configured to guide movement of the breakaway boom section relative to the inner boom section. A damper system may be operably coupled with the inner boom section and the breakaway boom section.

The damper system may include a cylinder configured to house a piston and a rod coupled to the piston and extending from the cylinder. The cylinder may define a piston-side chamber and a rod-side chamber within the cylinder. A pressure reducing-relieving valve may be fluidly coupled with the piston-side chamber and the rod-side chamber. A flow control valve may be positioned between the pressure reducing-relieving valve and the rod-side chamber. A relief valve may be positioned in parallel with the flow control valve.

When external force is applied to the break-away section, the damper system provided herein may allow for pressure to build at the adjustable pressure reducing-relieving valve to control the net extending force of the cylinder. In some cases, the adjustable pressure reducing-relieving valve can send a reduced pressure to both sides of the cylinder, resulting in a net extending force, due to the larger area of the base side of the cylinder. In such examples, the adjustable pressure reducing-relieving valve may maintain this pressure by letting more hydraulic fluid in or letting hydraulic fluid out of the cylinder. Moreover, this pressure may be adjustable via a set screw on the adjustable pressure reducing-relieving valve. When this pressure becomes higher than the set point of the adjustable pressure reducing-relieving valve, the adjustable pressure reducing-relieving valve allows the hydraulic fluid to exit to its tank connection. Once the external event is over, the adjustable pressure reducing-relieving valve allows the hydraulic fluid to flow back into the circuit until the pre-determined pressure set point is met again. This maintains a generally constant force on the damper system.

Additionally or alternatively, the damper system may utilize the adjustable flow control valve with a reverse flow check valve in parallel. This combination of valves may control the flow rate of the hydraulic fluid to the rod side of the hydraulic cylinder. The rod side of the cylinder is able to pull the hydraulic fluid in unrestricted, while retracting, due to the reverse flow check valve. When the rod of the cylinder is extending or positioning the break-away section in a default position, the flow control valve meters the hydraulic fluid being expelled. This results in an adjustable rate of speed for the boom section returning to its default position.

Additionally or alternatively, when the hydraulic fluid coming out of the rod is metered, there is a possibility of back pressure forming due to the restricted oil flow. To maintain working pressures within a defined range, the damper system may utilize an adjustable pressure relief valve. The adjustable pressure relief valve may limit the maximum pressure that can be experiences at the rod side of the cylinder.

Overall, the combination of using a hydraulic cylinder and hydraulic control valves results in a more controllable break-away section on an agricultural sprayer.

Figure 2:
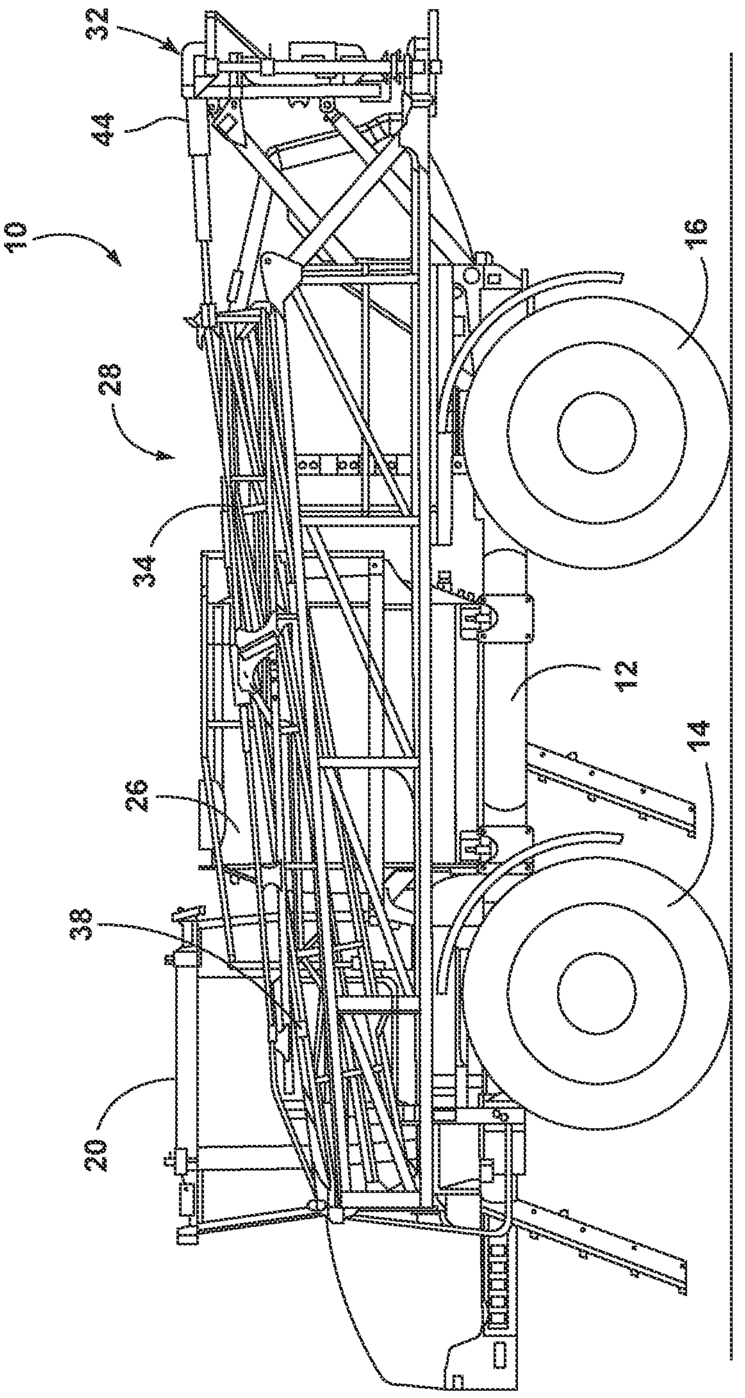
FIG. 2 illustrates a side view of the machine in accordance with aspects of the present subject matter.

Referring now to FIGS. 1 and 2, a machine 10 is generally illustrated as a self-propelled agricultural applicator. However, in alternate embodiments, the machine 10 may be configured as any other suitable type of machine 10 configured to perform agricultural application operations, such as a tractor or other machine configured to haul or tow an application implement.

In various embodiments, the machine 10 may include a chassis 12 configured to support or couple to a plurality of components. For example, front and rear wheels 14, 16 may be coupled to the chassis 12. The wheels 14, 16 may be configured to support the machine 10 relative to a ground surface and move the machine 10 in a forward direction of travel as indicated by arrow 18 in FIG. 1 (the direction of forward travel may be parallel to a fore-aft direction) across a field or the ground surface. In this regard, the machine 10 may include a power plant, such as an engine, a motor, or a hybrid engine-motor combination, to move the machine 10 along the field.

The chassis 12 may also support a cab 20, or any other form of operator's station, which provides various control or input devices 22 (e.g., levers, pedals, control panels, buttons, and/or the like) for providing various notifications to an operator and/or permitting the operator to control the operation of the machine 10. For instance, as shown in FIG. 1, the machine 10 may include a human-machine interface (HMI) 24 for displaying messages and/or alerts to the operator and/or for allowing the operator to interface with the machine's controller through the one or more user input devices 22.

The chassis 12 may also support a tank 26 and a boom assembly 28 mounted to the chassis 12. The tank 26 is generally configured to store or hold an agricultural product, such as a pesticide, a fungicide, a rodenticide, a fertilizer, a nutrient, and/or the like. The agricultural product stored in the tank 26 may be dispensed onto the underlying ground surface (e.g., plants and/or soil) through one or more nozzle assemblies 30 mounted on the boom assembly 28.

As shown in FIGS. 1 and 2, the boom assembly 28 may include a boom frame 32 that supports first and second boom arms 34, 36 in a cantilevered nature. The first and second boom arms 34, 36 are generally movable between an operative or unfolded position (FIG. 1) and an inoperative or folded position (FIG. 2). When distributing the product, the first and/or second boom arm 34, 36 extends laterally outboard from the machine 10 to cover wide swaths of soil, as illustrated in FIG. 1. However, to facilitate transport, each boom arm 34, 36 of the boom assembly 28 may be independently folded fore or aft into the inoperative position, thereby reducing the overall width of the machine 10, or in some examples, the overall width of a towable implement when the applicator is configured to be towed behind the machine 10.

Figure 3:
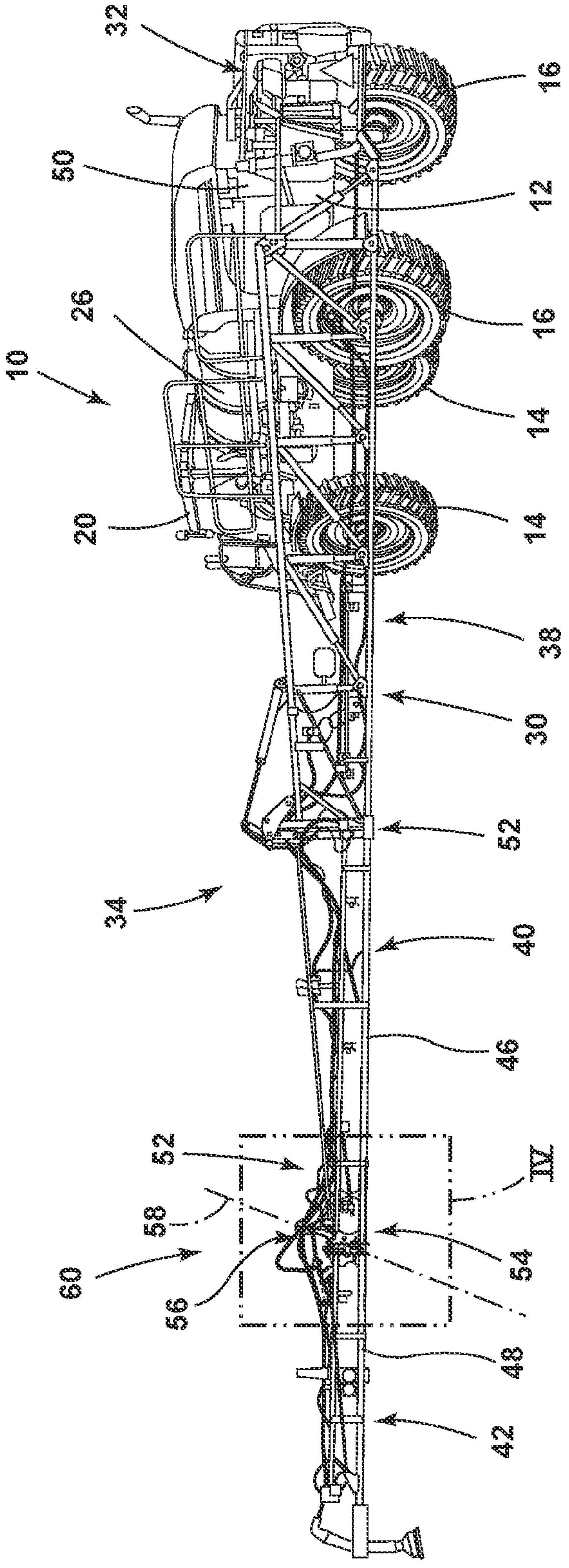
FIG. 3 is a rear view of a boom assembly that may be operably coupled with the machine in accordance with aspects of the present subject matter.

As shown in FIG. 3, each boom arm 34, 36 may include a number of sections. In the illustrated example, each boom arm 34, 36 (one of which is illustrated) includes a primary boom section 38, an outer boom section 40 (or inner boom section 40), and a breakaway boom section 42. In various examples, the primary boom section 38 may include a primary section frame 44, the outer boom section 40 may include an outer section frame 46, and/or the breakaway boom section 42 may include a breakaway boom section frame 48. In various examples, any boom section that is inboard of the breakaway boom section 42 may be generically referred to as an inner boom section.

In other examples, the boom arms 34, 36 may include more or less than two (2) sections. Inner end portions of the primary boom section 38 for each boom arm 34, 36 may be coupled to the boom frame 32 through a lift arm assembly 50. Hinge joints 52 may connect the outer end portions of the primary boom sections 38 with the inner end portions of the outer boom sections 40. In some instances, the hinge joints 52 can include one or more breakaway joints 54 may interconnect the outer end portions of the outer boom section 40 with the inner end portions of the breakaway boom sections 42. Each breakaway joint 54 may be configured to retain the breakaway boom sections 42 in an extended, default position, for example, with the breakaway boom section 42 extending from the outer boom section 40 or any other boom section. However, the breakaway joint 54 may be configured to allow the breakaway boom section 42 to move relative to the outer boom section 40 when contact is made with the breakaway boom section 42. In some examples, the breakaway joint 54 may include a hinge assembly 56 that guides the movement of the breakaway boom section 42 and may define a pivot axis 58 about which the breakaway boom section 42 pivots. The breakaway joint 54 may also include a damper system 60 that is positioned proximate to the breakaway joint 54.

Figure 4:
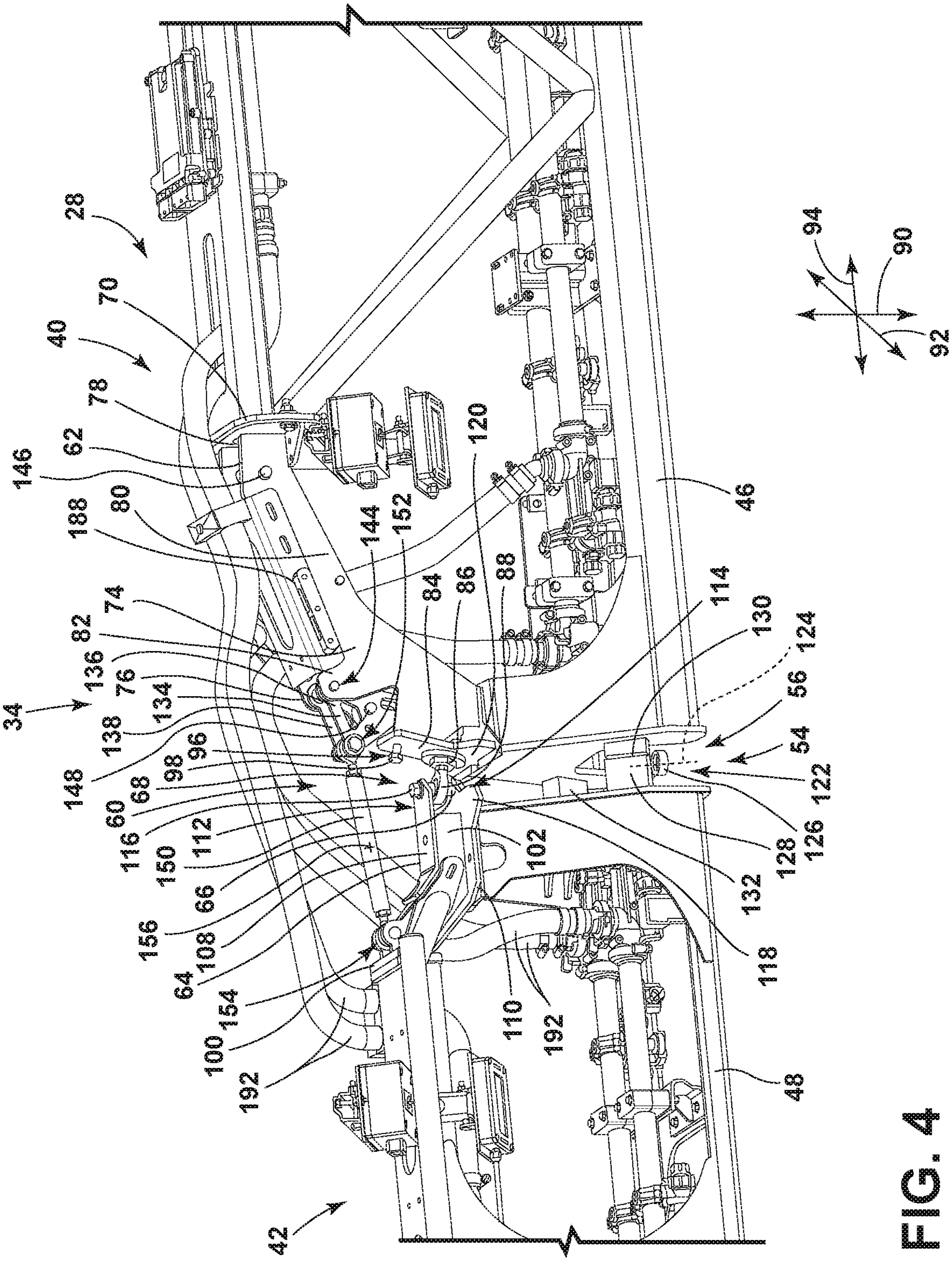
FIG. 4 is an enhanced front perspective view of area IV of FIG. 3 illustrating a portion of the boom assembly in accordance with aspects of the present subject matter.
Figure 5:
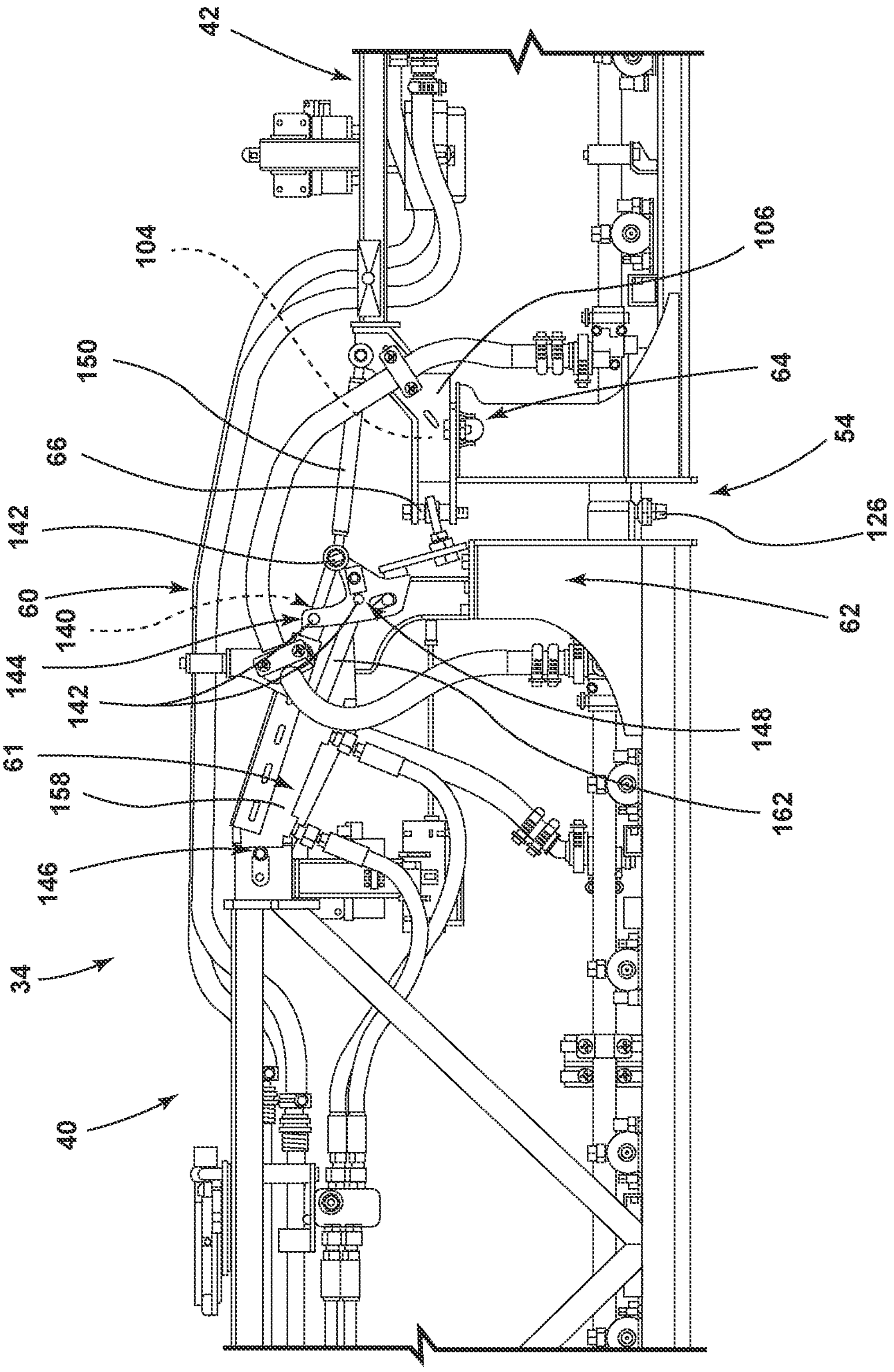
FIG. 5 is an enhanced rear perspective view of area IV of FIG. 3 illustrating a portion of the boom assembly in accordance with aspects of the present subject matter

Referring now to FIGS. 4 and 5, in some examples, the hinge assembly 56 may include an inner bracket 62 connected to the outer end portion of the outer boom section 40 and an outer bracket 64 connected to the inner end portion of the breakaway boom section 42. A hinge pin 66 may connect the inner and outer brackets 62, 64 to each other and defines a first hinge joint 68 about which the breakaway boom section 42 pivots.

In some examples, the inner bracket 62 may include an attachment plate 70 that may be configured to operably couple with the inner boom section 40, such as through one or more fasteners, adhesives, weldments, and/or any other practicable device or method. The inner bracket 62 may also include a pair of walls 74, 76. Each of the walls 74, 76 may include a first region 78, a second region 80 that may be offset from the first region 78, and a third region 82 that may be offset from the second region 78.

The inner bracket 62 may further include a mounting plate 84, which may be integrally formed with other portions of the inner bracket 62, and/or later attached thereto. In some examples, the mounting plate 84 may include a bore region 86, which may be configured to support a bore 88. As illustrated, the bore 88 may be offset from the machine vertical axis 90, which may be perpendicular to the fore/aft axis 92 and/or a lateral axis 94. Furthermore, the bore 88 may extend in a perpendicular direction to the mounting plate 84, and/or at any other defined angle. The mounting plate 84 may also include a stop region 96, which may be configured to support a stop 98.

The outer bracket 64 may include an attachment plate 100 that is operably coupled with a base 102. In some instances, the base 102 can include a pair of walls 104, 106. The outer bracket 64 may further include an upper plate 108 and a lower plate 110 that may extend laterally inboard of the base 102. The upper plate 108 may define a first opening 112 and the lower plate 110 may define a second opening 114. The hinge pin 66 may be retained within each of the first opening 112 and the second opening 114 with fasteners 116, and/or through any other practical device or method. The bore 88 may be positioned about the hinge pin 66 and guide rotation of the breakaway boom section 42 when the breakaway boom section 42 is rotated relative to the outer boom section 40. In some cases, a tilt angle defined between the inner boom section 40 and the breakaway boom section 42 is varied as the breakaway boom section 42 rotates relative to the inner boom section 40.

In some cases, the lower plate may include one or more fins 118 that extend fore and/or aft of the hinge pin 66. The fins 118 may be configured to prevent further rotation of the breakaway boom section 42 by contacting the mounting plate 84, and/or any other component, when the breakaway boom section 42 is rotated to a defined angle. In some examples, the mounting plate 84 may include corresponding wings 120 that extend fore and/or aft of the bore 88 that are configured to interact with the fins 118.

A second hinge joint 122 may be operably coupled with the inner bracket 62 and the outer bracket 64 and define a second movement axis 124. The second movement axis 124 may be fore or aft of the pivot axis 58. In some cases, the inner bracket 62 may be operably coupled with a rotation member 126, and the outer bracket 64 may include a projection 128 that may be coupled to the rotation member 126. The inner bracket 62 may further include a guide 130 that may further support the protection as the breakaway boom section 42 moves between various positions. Additionally or alternatively, in some examples, the outer bracket 64 and/or the inner bracket 62 can include bumper 132 or other contact device. When the breakaway boom section 42 is in a first, default position, the bumper 132 may be positioned at a first distance from the outer bracket 64 and/or the inner bracket 62 (the first distance is between the bracket that the bumper 132 is not connected with and the bumper 132). When the breakaway boom section 42 is in a section position, the bumper 132 may separate from the outer bracket 64 and/or the inner bracket 62 and may be positioned at a second distance from the outer bracket 64 and/or the inner bracket 62 (the second distance is between the bracket that the bumper 132 is not connected with and the bumper 132). In various examples, the first distance may be less than the second distance.

With further reference to FIGS. 4 and 5, in various instances, at least a portion of the inner bracket 62 is positioned above the damper system 60. A damper 61 within the damper system 60 may be configured to control the force and the speed at which the damper 61 resists movement of the breakaway boom section 42 and/or moves the breakaway boom section 42 to a default position once the breakaway boom section 42 is deflected. As shown, in some examples, the damper 61 may be at least partially below the inner bracket 62.

As shown, in some examples, a latch member 134 may be rotatably coupled with the inner bracket 62. The latch member 134 may include a pair of latch member walls 136, 138, one or more connection structures 140, and a plurality of pins 142 operably coupled with the latch member walls 136, 138. For example, the latch member 134 may be rotatably coupled with the inner bracket 62 at a first damper joint 144. The damper 61 may also be coupled with the inner bracket 62, at a second damper joint 146. Moreover, an opposing end portion of the damper 61 may be operably coupled with the latch member 134 at a third damper joint 148.

As shown, in some examples, a linkage 150 may be operably coupled with the latch member 134 on a first end portion thereof and the outer bracket 64 on a second end portion thereof. In some cases, the coupling of the linkage 150 with the latch member 134 may form a fourth damper joint 152. Further, the coupling of the linkage 150 with the outer bracket 64 may form a fifth damper joint 154. In some cases, the fifth damper joint 154 may be positioned at least partially below the first damper joint 144, the second damper joint 146, and/or the fourth damper joint 152.

In various examples, the linkage 150 may be of an adjustable width or fixed length. Moreover, in some instances, the linkage 150 may be positioned at least partially vertically below at least a portion of the inner bracket 62. Additionally or alternatively, a center point 156 of the linkage 150 may be positioned at least partially laterally outboard of the hinge pin 66 relative to a frame 32 of the boom assembly 28.

Figure 6:
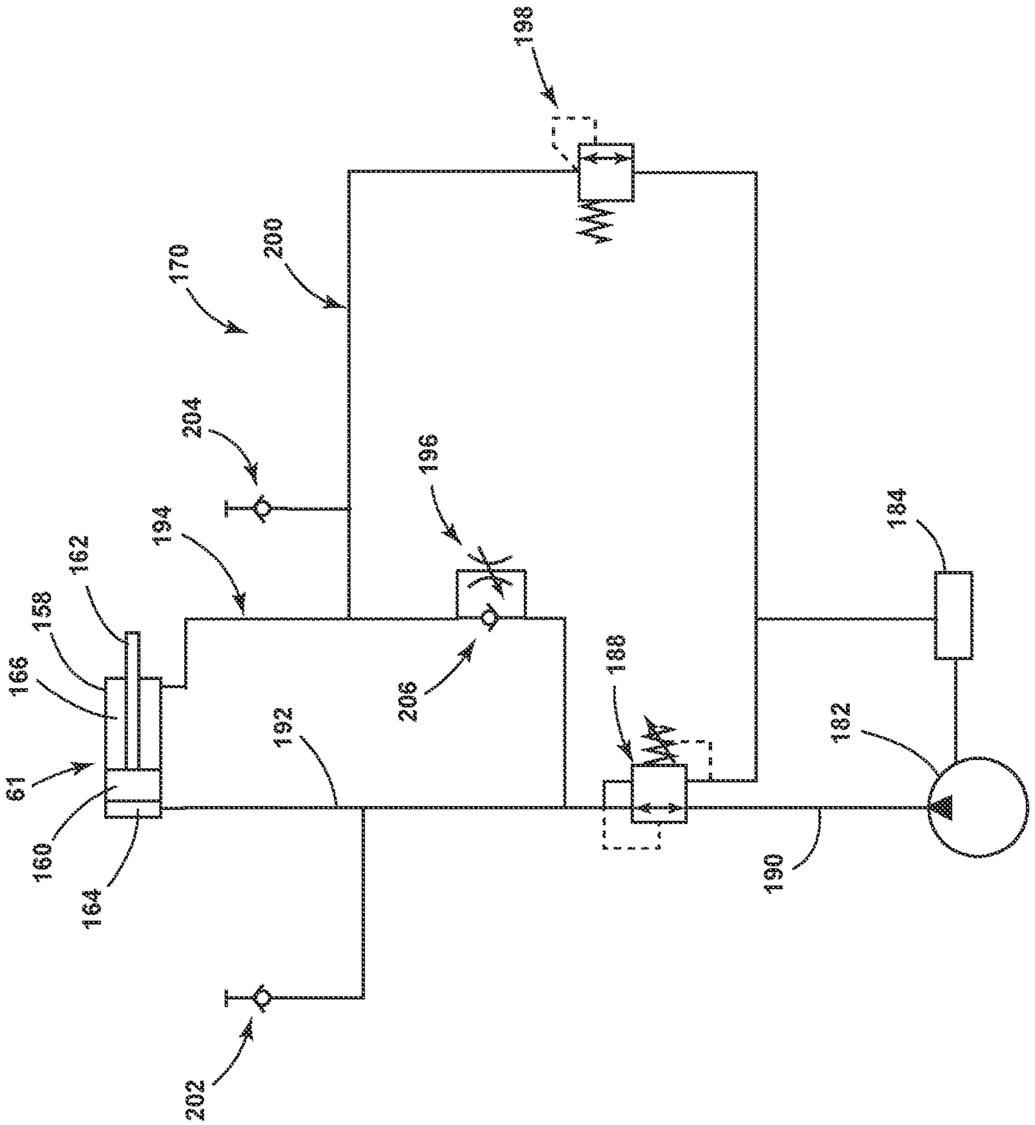
FIG. 6 is a hydraulic circuit operably coupled with a breakaway boom section actuator.

With reference to FIGS. 4-6, in several examples, the damper 61 may correspond to a suitable hydraulic actuator. In such examples, the damper 61 may include both a cylinder 158 configured to house a piston 160 and a rod 162 coupled to the piston 160 that extends from the cylinder 158. Additionally, the cylinder 158 may define a piston-side chamber 164 and a rod-side chamber 166 defined within the cylinder 158. By regulating the pressure of the fluid supplied to one or both of the cylinder chambers 164, 166, the actuation of the rod 162 may be controlled. As shown in FIGS. 4-6, the end portion of the rod 162 can be coupled to the latch member 134 at the third damper joint 148, while the cylinder 158 may be pivotably coupled to the inner bracket 62 at the second damper joint 146. However, the end portion of the rod 162 may be pivotably coupled to the inner bracket 62 while the cylinder 158 may be coupled to the latch member 134 without departing from the teachings provided herein.

With further reference to FIG. 6, in some examples, the machine 10 may also include a hydraulic system 170, which may provide a source of pressurized hydraulic fluid for driving and/or positioning the damper 61. In such examples, the hydraulic system 170 may be utilized to control the force and the speed at which the damper 61 resists movement of the breakaway boom section 42 and/or moves the breakaway boom section 42 to a default position once the breakaway boom section 42 is deflected. In general, hydraulic system 170 will be described herein with reference to the machine 10 shown in FIGS. 1-5. However, the disclosed hydraulic system 170 may be utilized with any other suitable machine. In FIG. 6, hydraulic or fluid couplings of the hydraulic system 170 are indicated by solid lines.

As illustrated in FIG. 6, one or more pumps 182 may be fluidly coupled with the hydraulic circuit 170 and configured to provide a pressurized fluid to the hydraulic circuit 170. In some examples, an adjustable pressure reducing-relieving valve 188 may be positioned downstream of the pump 182 via a first hydraulic line 190. In several examples, the adjustable pressure reducing-relieving valve 188 may be configured to provide a reduced pressure to the piston-side chamber 164 of the cylinder 158 via a second hydraulic line 192 and the rod-side chamber 166 of the cylinder 158 via a third hydraulic line 194, which may result in a net extending force, which, in turn, may maintain the breakaway boom section 42 (FIG. 5) in a generally defined position. When an external force is applied to the breakaway boom section 42 (FIG. 5), the pressure may build at the outlet of the pressure reducing-relieving valve 188. When this pressure is greater than a set point of the pressure reducing-relieving valve 188, a portion of the hydraulic fluid is dumped into a tank 184. Once the external force is removed from the breakaway boom section 42 (FIG. 5), the pressure reducing-relieving valve 188 may allow hydraulic fluid back into the circuit to return the breakaway boom section 42 (FIG. 5) to its default position. In various instances, the amount of external force needed to displace the breakaway boom section 42 (FIG. 5) from the default position may be adjusted, such as via a set screw on the pressure reducing-relieving valve 188.

In some examples, an adjustable flow control valve 196, possibly with a reverse flow check valve 206 in parallel, may be positioned along the third hydraulic line 194 and/or between the pressure reducing-relieving valve 188 and the rod-side chamber 166 of the cylinder 158. In various examples, the flow control valve 196 may control the flow rate of the hydraulic fluid to the rod-side chamber 166 of the cylinder 158. In various instances, when the breakaway boom section 42 (FIG. 5) is deflected, the rod-side chamber 166 of the cylinder 158 may be configured to pull hydraulic fluid into the rod-side chamber 166 of the cylinder 158, possibly in an unrestricted manner. When the breakaway boom section 42 (FIG. 5) returns to its default position, the flow control valve 196 may meter the hydraulic fluid expelling from the rod-side chamber 166 of the cylinder 158. In such instances, an adjustable rate of speed for the breakaway boom section 42 (FIG. 5) to return to the default position may be defined at least in part by the adjustable flow control valve 196.

As illustrated in FIG. 6, an adjustable mechanical relief valve 198 may be positioned in parallel with the flow control valve 196 via a fourth hydraulic line 200. In such instances, the fourth additional hydraulic line 200 may be fluidly coupled between with the third hydraulic line 194 between the flow control valve 196 to the rod-side chamber 166 of the cylinder 158. In some instances, the relief valve 198 may control a maximum pressure that can be experienced by the rod-side chamber 166 of the cylinder 158. For instance, when the hydraulic fluid being removed from the rod-side chamber 166 of the cylinder 158 is metered, a defined amount of back pressure may be generated. As such, the relief valve 198 may be configured to protect the damper 61 from any sudden pressure spikes by regulating an amount of back pressure that may be experienced by the cylinder 158.

With further reference to FIG. 6, a first check valve 202 may be fluidly coupled with the second hydraulic line 192 at a position between the pressure reducing-relieving valve 188 and the piston-side chamber 164 of the cylinder 158. Additionally or alternatively, a second check valve 204 may be fluidly coupled with the third hydraulic line 194 or the fourth hydraulic line 200 at a position between the flow control valve 196, the rod-side chamber 166 of the cylinder 158, and the relief valve 198.

Accordingly, the hydraulic circuit provided herein may allow for adjustable speed/flow settings for controlling how quickly a breakaway boom section 42 (FIG. 5) returns to its home position once deflected. It will be appreciated, however, that any other circuit (e.g., hydraulic, pneumatic, electronic, etc.) may be used in conjunction with or instead of the hydraulic circuit described herein without departing from the teachings provided herein.

Figure 7:
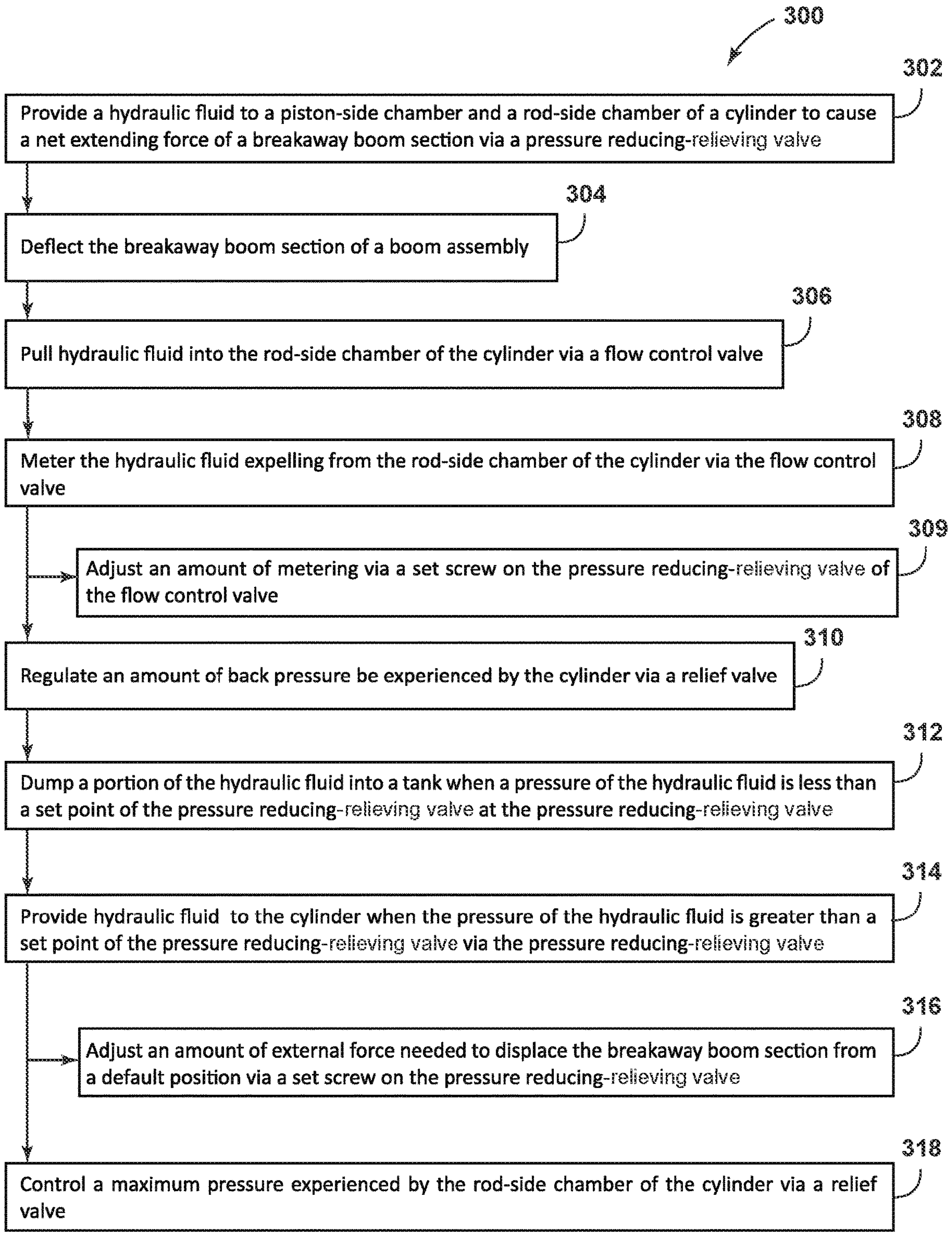
FIG. 7 illustrates a flow diagram of a method for an agricultural application operation in accordance with aspects of the present subject matter.

Referring now to FIG. 7, a flow diagram of some embodiments of a method 300 for an agricultural application operation is illustrated in accordance with aspects of the present subject matter. In general, the method 300 will be described herein with reference to the machine 10 described above with reference to FIGS. 1-6. However, the disclosed method 300 may generally be utilized with any suitable agricultural machine 10 and/or may be utilized in connection with a system having any other suitable system configuration. In addition, although FIG. 7 depicts steps performed in a particular order for purposes of illustration and discussion, the methods discussed herein are not limited to any particular order or arrangement. One skilled in the art, using the disclosures provided herein, will appreciate that various steps of the methods disclosed herein may be omitted, rearranged, combined, and/or adapted in various ways without deviating from the scope of the present disclosure.

As illustrated in FIG. 7, at (302), the method 300 may include providing a hydraulic fluid to a piston-side chamber and a rod-side chamber of a cylinder to cause a net extending force of a breakaway boom section via a pressure reducing-relieving valve.

At (304), the method 300 may include deflecting the breakaway boom section of a boom assembly. The deflection may be caused by an object that contacts the breakaway boom section and/or otherwise causes the breakaway boom section to move from its default position.

At (306), the method 300 may include pulling hydraulic fluid into the rod-side chamber of the cylinder via a flow control valve. In addition, at (308), the method 300 may include metering the hydraulic fluid expelling from the rod-side chamber of the cylinder via the flow control valve. In some cases, at (309), the method 300 may include adjusting an amount of metering via a set screw on the pressure reducing-relieving valve of the flow control valve.

At (310), the method 300 may include regulating an amount of back pressure be experienced by the cylinder via a relief valve. In addition, at (312), the method 300 may include dumping, at the pressure reducing-relieving valve, a portion of the hydraulic fluid into a tank when a pressure of the hydraulic fluid is greater than a set point of the pressure reducing-relieving valve. Further, at (314), the method 300 may include providing, via the pressure reducing-relieving valve, hydraulic fluid to the cylinder when the pressure of the hydraulic fluid is less than a set point of the pressure reducing-relieving valve. In some examples, at (316), the method 300 may include adjusting, via a set screw on the pressure reducing-relieving valve, an amount of external force needed to displace the breakaway boom section from a default position.

Lastly, at (318), the method may include controlling a maximum pressure experienced by the rod-side chamber of the cylinder via a relief valve. For instance, when the hydraulic fluid being removed from the rod-side chamber of the cylinder is metered, a defined amount of back pressure may be generated. As such, the relief valve may be configured to protect the damper from any sudden pressure spikes by regulating an amount of back pressure that may be experienced by the cylinder.

It is to be understood that the steps of any method disclosed herein may be performed by a computing system upon loading and executing software code or instructions that are tangibly stored on a tangible computer-readable medium, such as on a magnetic medium, e.g., a computer hard drive, an optical medium, e.g., an optical disc, solid-state memory, e.g., flash memory, or other storage media known in the art. Thus, any of the functionality performed by the computing system described herein, such as any of the disclosed methods, may be implemented in software code or instructions that are tangibly stored on a tangible computer-readable medium. The computing system loads the software code or instructions via a direct interface with the computer-readable medium or via a wired and/or wireless network. Upon loading and executing such software code or instructions by the controller, the computing system may perform any of the functionality of the computing system described herein, including any steps of the disclosed methods.

The term "software code" or "code" used herein refers to any instructions or set of instructions that influence the operation of a computer or controller. They may exist in a computer-executable form, such as vehicle code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. An agricultural boom assembly comprising:

an inner boom section;

a breakaway boom section;

a hinge assembly configured to guide movement of the breakaway boom section relative to the inner boom section; and a damper system operably coupled with the inner boom section and the breakaway boom section, the damper system comprising:

a cylinder configured to house a piston;

a rod coupled to the piston and extending from the cylinder, the cylinder defining a piston-side chamber and a rod-side chamber within the cylinder;

a pump configured to provide a pressurized fluid to a hydraulic circuit;

a pressure reducing-relieving valve having an inlet fluidly coupled with the pump through a first hydraulic line and a first outlet fluidly coupled with the piston-side chamber and the rod-side chamber through a second hydraulic line;

a third hydraulic line fluidly in parallel with a portion of the second hydraulic line, the third hydraulic line fluidly coupled with the second hydraulic line on an opposing side of the pressure reducing-relieving valve from the first hydraulic line;

a flow control valve positioned along the third hydraulic line between the pressure reducing-relieving valve and the rod-side chamber;

a fourth hydraulic line fluidly coupled with the third hydraulic line between the flow control valve and the rod-side chamber, the fourth hydraulic line further fluidly coupled with a second outlet of the pressure reducing-relieving valve; and a relief valve positioned along the fourth hydraulic line and in parallel with the flow control valve.

2. The agricultural boom assembly of claim 1, wherein the relief valve is positioned upstream of a tank.

3. The agricultural boom assembly of claim 1, wherein a reverse flow check valve is in parallel with the flow control valve.

4. The agricultural boom assembly of claim 3, wherein the pressure reducing relieving valve is configured to provide a reduced pressure to the piston-side chamber and the rod-side chamber to cause a net extending force of the breakaway boom section.

5. The agricultural boom assembly of claim 1, wherein the flow control valve is configured to control a flow rate of the pressurized fluid to the rod-side chamber of the cylinder.

6. The agricultural boom assembly of claim 1, wherein the flow control valve is configured to meter the pressurized fluid expelling from the rod-side chamber of the cylinder to define a rate of speed for the breakaway boom section to move from a deflected position to a default position.

7. The agricultural boom assembly of claim 6, wherein the relief valve is configured to control a maximum pressure that can be experienced by the rod-side chamber.

8. The agricultural boom assembly of claim 1, further comprising:

a first check valve positioned between the pressure reducing relieving valve and the piston-side chamber of the cylinder.

9. The agricultural boom assembly of claim 8, further comprising: a second check valve fluidly positioned between the the rod-side chamber, and the relief valve.

10. The agricultural boom assembly of claim 1, wherein altering an amount of the pressurized fluid within the piston-side chamber and the rod-side chamber alters a position of the breakaway boom section relative to the inner boom section.

11. A damper system for a boom assembly, the damper system comprising:

a cylinder configured to house a piston;

a rod coupled to the piston and extending from the cylinder, the cylinder defining a piston-side chamber and a rod-side chamber within the cylinder;

a pressure reducing-relieving valve having an inlet fluidly coupled with a pump through a first hydraulic line and a first outlet fluidly coupled with the piston-side chamber and the rod-side chamber through a second hydraulic line;

a third hydraulic line fluidly in parallel with a portion of the second hydraulic line, the third hydraulic line fluidly coupled with the second hydraulic line on an opposing side of the pressure reducing-relieving valve from the first hydraulic line;

a flow control valve positioned along the third hydraulic line between the pressure reducing-relieving valve and the rod-side chamber;

a fourth hydraulic line fluidly coupled with the third hydraulic line between the flow control valve and the rod-side chamber, the fourth hydraulic line further fluidly coupled with a second outlet of the pressure reducing-relieving valve; and a relief valve positioned along the fourth hydraulic line and in parallel with the flow control valve.

12. The damper system of claim 11, wherein the cylinder is operably coupled with an inner boom section and a breakaway boom section of the boom assembly.

13. The damper system of claim 12, wherein the pressure reducing-relieving valve is configured to provide a reduced pressure to the piston-side chamber and the rod-side chamber to cause a net extending force of the breakaway boom section.

14. The damper system of claim 11, wherein the flow control valve is configured to control a flow rate of hydraulic fluid to the rod-side chamber of the cylinder.

15. A damper system for a boom assembly, the damper system comprising:

a cylinder configured to house a piston;

a rod coupled to the piston and extending from the cylinder, the cylinder defining a piston-side chamber and a rod-side chamber within the cylinder;

a pressure reducing-relieving valve having an inlet fluidly coupled with a pump through a first hydraulic line and a first outlet fluidly coupled with the piston-side chamber and the rod-side chamber through a second hydraulic line;

a third hydraulic line fluidly in parallel with a portion of the second hydraulic line, the third hydraulic line fluidly coupled with the second hydraulic line on an opposing side of the pressure reducing-relieving valve from the first hydraulic line;

a flow control valve positioned along the third hydraulic line between the pressure reducing-relieving valve and the rod-side chamber;

a reverse flow check valve is in parallel with the flow control valve;

a fourth hydraulic line fluidly coupled with the third hydraulic line between the flow control valve and the rod-side chamber, the fourth hydraulic line further fluidly coupled with a second outlet of the pressure reducing-relieving valve; and a relief valve positioned along the fourth hydraulic line and in parallel with the flow control valve.

16. The damper system of claim 15, wherein the cylinder is operably coupled with an inner boom section and a breakaway boom section of the boom assembly.

17. The damper system of claim 16, wherein the pressure reducing-relieving valve is configured to provide a reduced pressure to the piston-side chamber and the rod-side chamber to cause a net extending force of the breakaway boom section.

18. The damper system of claim 15, wherein the flow control valve is configured to control a flow rate of hydraulic fluid to the rod-side chamber of the cylinder.

* * * * *